(12) United States Patent
Fujita et al.

(10) Patent No.: US 7,115,159 B2
(45) Date of Patent: Oct. 3, 2006

(54) SOLID FILLING TANK

(75) Inventors: Katsuyoshi Fujita, Aichi (JP);
Hidehito Kubo, Aichi (JP); Keiji Toh, Aichi (JP); Akiko Kumano, Aichi (JP);
Daigoro Mori, Shizuoka (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 223 days.

(21) Appl. No.: 10/713,134

(22) Filed: Nov. 14, 2003

(65) Prior Publication Data
US 2005/0051294 A1 Mar. 10, 2005

(30) Foreign Application Priority Data
Nov. 15, 2002 (JP) .......................... P2002-332415

(51) Int. Cl.
*B01D 53/04* (2006.01)
*F28D 19/00* (2006.01)
*F28F 7/00* (2006.01)

(52) U.S. Cl. ............................ 96/108; 96/146; 96/152; 165/138

(58) Field of Classification Search .................. 96/108, 96/121, 126–128, 139, 146, 152; 165/138, 165/179
See application file for complete search history.

(56) References Cited

U.S. PATENT DOCUMENTS

| | | | | |
|---|---|---|---|---|
| 2,450,289 A | * | 9/1948 | Marek | 422/120 |
| 3,224,168 A | * | 12/1965 | Gregory | 96/146 |
| 3,229,722 A | * | 1/1966 | Kritzer | 138/39 |
| 3,335,550 A | * | 8/1967 | Stern | 96/144 |
| 4,089,185 A | * | 5/1978 | Kemmer et al. | 62/55.5 |
| 4,147,523 A | * | 4/1979 | Izumo | 96/126 |
| 4,480,684 A | * | 11/1984 | Onishi et al. | 165/110 |
| 4,581,049 A | * | 4/1986 | Januschkowetz | 96/126 |
| 4,794,985 A | * | 1/1989 | Paulman et al. | 165/150 |
| 5,388,637 A | * | 2/1995 | Jones et al. | 165/104.12 |
| 6,432,176 B1 | * | 8/2002 | Klos et al. | 96/117.5 |
| 2002/0020299 A1 | * | 2/2002 | Iwamoto et al. | 96/146 |

FOREIGN PATENT DOCUMENTS

| | | | |
|---|---|---|---|
| DE | 32 26 502 A1 | * | 2/1983 |
| JP | 54-46185 A | * | 4/1979 |
| JP | 4-148194 A | * | 5/1992 |
| JP | 11-43301 | | 2/1999 |
| JP | 2000-111193 | | 4/2000 |
| JP | 2001-10801 | | 1/2001 |

* cited by examiner

*Primary Examiner*—Robert A. Hopkins
(74) *Attorney, Agent, or Firm*—Morgan & Finnegan, LLP

(57) ABSTRACT

In a hydrogen storing tank (solid filling tank) in which a hydrogen absorbing alloy (solid) is filled, a heat exchanger for executing heat exchange with the hydrogen absorbing alloy is constructed by laminating alternately first heat-transferring fins formed in corrugated plate shape and second heat-transferring fins formed in flat plate shape. Partitioned portions that are partitioned by the first heat-transferring fins and the second heat-transferring fins restrict movement of hydrogen absorbing alloy powders (MH powders) in a subsiding direction. Therefore, movement of the MH powders can surely be prevented by not using members that has no concern with the heat exchange and reduces an amount of filled MH powders and a volume in which the heat exchanger is provided.

6 Claims, 6 Drawing Sheets

SOLID FILLING TANK

BACKGROUND OF THE INVENTION

1. Field of the Invention

The present invention relates to a solid filling tank in which solid particles capable of absorbing or adsorbing a gas such as a hydrogen gas, are filled.

2. Description of the Related Art

As well as heat of solar light, there is given a great attention to hydrogen as clean energy source. Especially in developing a fuel system for a hydrogen fuel cell vehicle, attention is focused on a technology to effectively store and discharge hydrogen by utilizing a hydrogen absorbing alloy that absorbs hydrogen. As for a particular example of such technology, there is known a technology to fill hydrogen absorbing alloy powders in a storage tank (hydrogen storage tank), and to cause the hydrogen absorbing alloy powders in the storage tank to absorb and store the hydrogen and to discharge for utilizing the hydrogen. The hydrogen absorbing alloy has the characteristic that generates heat when absorbing hydrogen and absorbs heat when discharging the hydrogen. Therefore, a heat exchanger is normally disposed in the hydrogen storing tank as a mechanism for absorbing or discharging the hydrogen. For example, a heat exchanger is employed having such a structure that a plurality of heat-transferring fins are arranged in a manner like the teeth of a comb on an outer periphery of the cooling/heating medium tube through which the refrigerant or the heating medium is circulated. There is disclosed in JP-2000-111193 (particularly in paragraphs [0011] and [0012]) another type of heat exchanger having the structure that circulation paths through which the refrigerant or the heating medium is circulated are configured by using combination of corrugated plates and flat plates in place of the cooling/heating medium tube in the aforementioned heat exchanger.

The hydrogen absorbing alloy has a property that expands when absorbing hydrogen. Therefore, when the filled hydrogen absorbing alloy powders absorb hydrogen in a state subsided and consolidated in the storage tank, in some cases, an excessive stress is locally generated against a tank main body due to the expansion of the hydrogen absorbing alloy and the stress influences on a tank main body of the storage tank or on a lining member disposed in the storage tank. For this reason, as the measure against such problem, there has been proposed a technology to provide a structure to prevent the subsidence of the hydrogen absorbing alloy powders. There also has been proposed a structure to absorb the stress caused by the hydrogen absorbing tank when absorbing the hydrogen. As for such technology, a first technology and a second technology described in the following have been conventionally proposed.

In the first technology, as described in JP-11-043301 (particularly in paragraph [0009] and in FIG. 2), a sheet member is provided between a plurality of fin-shaped tubes constituting a heat exchanger, whereby the subsidence of the hydrogen absorbing alloy powders is prevented. In the second technology, as described in JP-2001-010801 (particularly in paragraph [0024]), the subsidence of the hydrogen absorbing alloy powders is prevented by a cooling/heating medium tube having a hollow pipe structure and having a sectional shape configured to be an ellipse.

According to the first technology to provide the sheet member between a plurality of the fin tubes, the subsidence of the hydrogen absorbing alloy powders can be prevented. However, extra space to provide an extra member such as the sheet member is needed in the tank main body of the storage tank. Thus, a filled volume of the hydrogen absorbing alloy powders (gas absorbing solids) and a space for the heat exchanger need to be reduced correspondingly. Also, in the first technology, since a plurality of the fin tubes and a plurality of the heat-transferring fins are arranged in cross-sectional direction of the tank main body of the storage tank, the heat-transferring fins, in between the fin tubes, do not come into contact with the hydrogen absorbing alloy powders in many areas. Therefore, in the first technology, the subsidence of the hydrogen absorbing alloy powders in the tank can be prevented, whereas reduction in the heat exchanging performance between the hydrogen absorbing alloy powders and the heat exchanger becomes a problem. In the second technology, the problem in the first technology can be overcome by preventing the subsidence of the hydrogen absorbing alloy powders by use of the cooling/heating medium tube. Nevertheless, there is the limit to prevent the subsidence of the hydrogen absorbing alloy powders since the cooling/heating medium tube has the R portion (curved portion). Therefore, it is hard to say that the second technology is the exact approach.

SUMMARY OF THE INVENTION

In view of the aforementioned problems, the inventors of the present invention considered that, if movement of gas absorbing solids (solid particles) in a solid filling tank (storage tank) can be surely restricted without lowering the heat exchanging performance between the gas absorbing solids, such as the hydrogen absorbing alloy powders, and a heat exchanger, such technology has a merit. Thus, the inventors of the present invention have studied earnestly a technology to construct the gas absorbing body tank of the concerned type. As a result, the inventors of the present invention have succeeded in finding out that, if the heat-transferring fins of the heat exchanger that executes essentially the heat exchange with the gas absorbing solids are also used as a means for restricting movement of the gas absorbing solids in the solid filling tank, the problems of the conventional technology can be rationally avoided. Also, the inventors of the present invention have found that the technology according to the present invention to construct the gas absorbing body tank is not limited to the technology to fill the gas absorbing solids that can absorb a predetermined gas, and such technology can be applied to the technology to fill the gas adsorbing solids that can adsorb a predetermined gas.

It is an object of the present invention to provide a technology that is useful to surely prevent movement of solid particles being filled in a solid filling tank without lowering the heat exchanging performance between the solid particles and a heat exchanger, in a solid filling tank in which the heat exchanger is fitted in a tank main body of the solid filling tank in which the solid particles capable of absorbing or adsorbing a predetermined gas are filled.

In order to achieve the above object, according to one aspect of the invention, there is provided a solid filling tank including: a tank main body configured to be filled with solid particles capable of absorbing or adsorbing a predetermined gas; and a heat exchanger disposed within the tank main body, wherein the heat exchanger includes: a circulation tube configured to circulate a medium to exchange heat with the solid particles; and a plurality of heat-transferring fins each attached to the circulation tube and arranged in parallel to each other, wherein the heat-transferring fins comprise a restricting portion configured to restrict movement of the solid particles in a subsiding direction of the solid particles.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Figure 1:
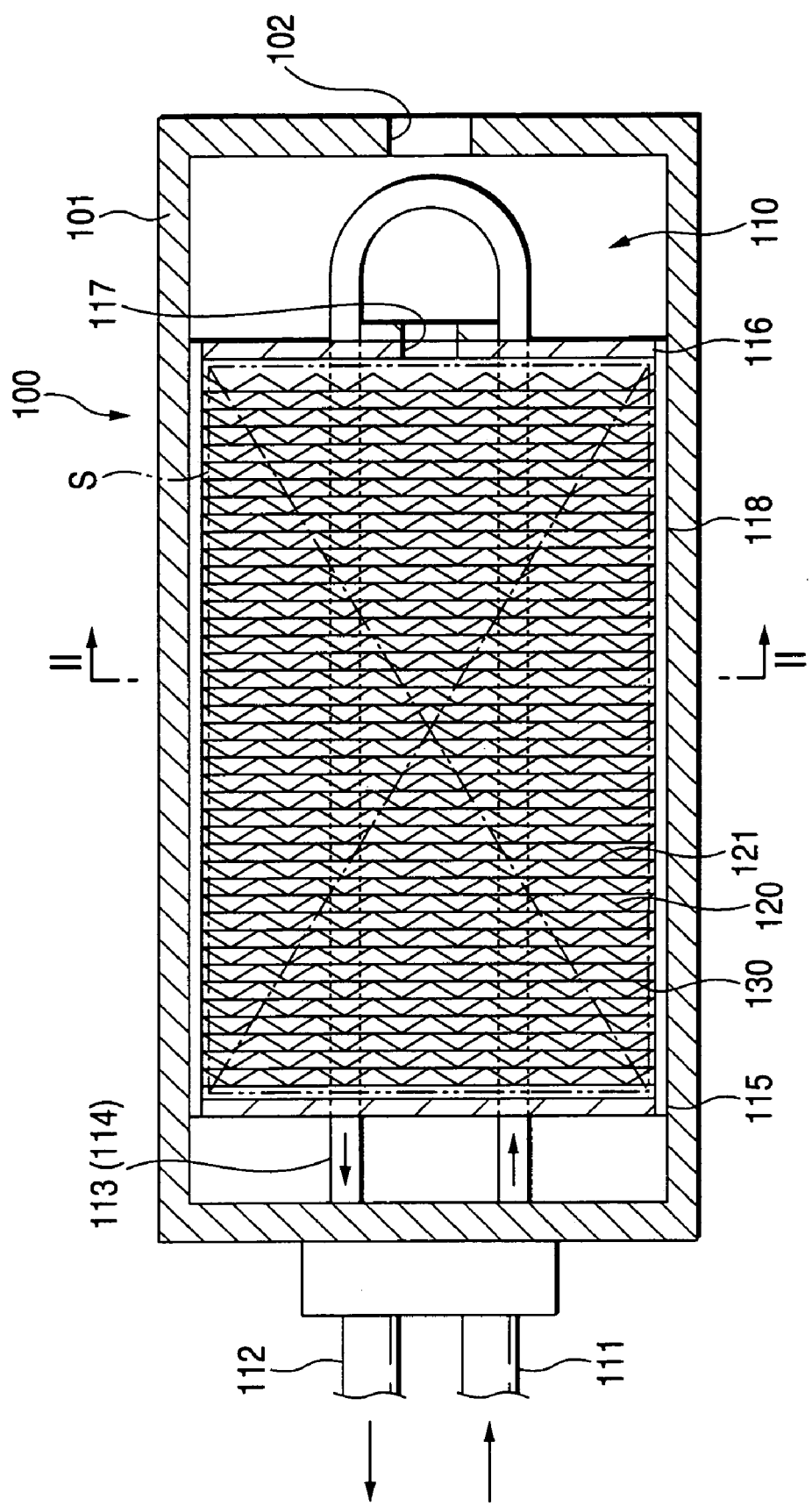
FIG. 1 is a sectional view showing a configuration of a hydrogen storing tank according to one embodiment of the invention.

Hereinafter, prior to describing the preferred embodiments according to the invention, various aspects of the invention will be described in detail.

The present invention provides a technology that, since movement of solid particles capable of absorbing or adsorbing a predetermined gas is restricted by a plurality of heat-transferring fins constituting a heat exchanger disposed in a solid filling tank, the movement of the solid particles filled in the solid filling tank can be prevented from the heat exchanging performance between the solid particles and the heat exchanger to be lowered. The present invention is not simply limited to the technology to provide a restricting portion for restricting the movement of the solid particles to a tank main body of the solid filling tank. The present invention can implement a rational technology to construct a solid filling tank, which is not easily thought of from the conventional technology, having heat-transferring fins, which act to transfer and exchange heat, includes a restricting portion for restricting the movement of the solid particles that are filled in the solid filling tank.

A solid filling tank according to a first aspect of the invention has such a structure that a heat exchanger for executing heat exchange with solid particles are disposed in a tank main body in which the solid particles that are capable of absorbing or adsorbing a predetermined gas are filled. The "solid particles" mentioned herein intend to include widely the solid particles having a function of absorbing a predetermined gas, such made of various gas absorbing alloy (gas absorbing solid) for absorbing a gas such as hydrogen and nitrogen, the solid particles made of a material having a function of adsorbing a predetermined gas, such as carbon and molecular sieve (gas adsorbing solid). Therefore, as the solid filling tank of the present invention, a gas absorbing body tank in which gas absorbing solid particles are filled, a gas adsorbing body tank in which gas adsorbing solid particles are filled may be listed. In the present invention, out of various absorbing phenomena, the absorption performed by solid is defined as "absorption".

The heat exchanger includes circulation tubes, a plurality of heat-transferring fins and a restricting portion. The circulation tubes are configured to circulate a heat exchanging medium as a "medium" for heating and cooling the solids. A plurality of heat-transferring fins are attached on outer periphery of the circulation tubes and arranged in parallel to each other (arranged in a layered manner). A plurality of heat-transferring fins are attached to the outer peripheries of the circulation tubes by brazing, for example. For instance, heat of the medium circulated through the circulation tubes is transferred to respective heat-transferring fins via tube walls of the circulation tubes, and then is transferred to the solid particles that contact with the heat-transferring fins. Therefore, the heat exchange is carried out between the medium and the solid particles.

The restricting portion includes a partitioned portion formed in between each of the opposing pair of the heat-transferring fins. In other words, the restricting portions partitions spaces (portions) formed in between each opposing pair of the heat-transferring fins. The restricting portion restricts the movement of the solid particles in a subsiding direction. For example, when hydrogen absorbing alloy powders are filled as the solid particles, there is apprehension about the possibility such that the hydrogen absorbing alloy powders expand when absorbing hydrogen and move in the subsiding direction in the solid filling tank. Therefore, as the measure to prevent the subsidence of such hydrogen absorbing alloy powders, the restricting portion is provided. In the present invention, the restricting portion is configured by the heat-transferring fins. More particularly, the structure in which the partitioned portions are formed by arranging alternately first heat-transferring fins that are formed in corrugated plate shape and second heat-transferring fins that are formed in flat plate shape in parallel to each other. Alternatively, the structure in which the partitioned portions may be formed by arranging a plurality of heat-transferring fins formed in corrugated plate shape in parallel to each other. Further, the structure in which the partitioned portions may be formed by arranging a plurality of heat-transferring fins formed in flat plate shape and each having upright portions thereon in parallel to each other. The restricting portions of the present invention are configured by using a part or all of a plurality of heat-transferring fins. The "corrugated plate shape" mentioned herein intends to include widely the mode in which a fold-backed portion is formed in an acutely bent manner and the mode in which the corner portion is curved at a predetermined curvature R. As the shape of the heat-transferring fins formed in corrugated plate shape that are obtained by such folding or bending, various modes including not only a triangle shape but also a rectangle (square) shape may be employed. Since the heat-transferring fins for performing the heat exchange with the solid particles include the restricting portion for restricting the subsidence of the solid particles, the movement of the solid particles can be prevented without using a member that has no concern with the heat exchange and not to reduce an amount of filled solid particles and space in which the heat exchanger is provided. As a result, the heat exchanging performance between the solid particles and the heat exchanger can be improved rather than the case where the members having no concern with the heat exchange are disposed in the solid filling tank. Also, it is preferable that the structure should be employed that prevents the reduction in the heat exchanging performance between the heat-transferring fins and the solid particles by reducing areas in which the solid particles are not in contact with the heat-transferring fins. The present invention, when applied to the hydrogen absorbing alloy tank in which the hydrogen absorbing alloy is filled as the solid particles, is effective to prevent the subsiding of the hydrogen absorbing alloy in the solid filling tank and to prevent an excessive stress locally generated due to the expansion of the hydrogen absorbing alloy when the hydrogen absorbing alloy absorbs the hydrogen.

As described above, according to the first aspect of the invention, the movement of the solid particles being filled in the solid filling tank in the subsiding direction can be surely prevented without lowering the heat exchanging performance between the solid particles and the heat exchanger.

According to a second aspect of the invention, a plurality of heat-transferring fins are configured to be arranged in parallel to each other to form a plurality of partitioned portions between each opposing pair of the heat-transferring fins. A plurality of the partitioned portions are formed between superposed surfaces by arranging a plurality of heat-transferring fins farther apart from each other in a predetermined distance and to be in parallel to each other. The movement of the solid particles, which are filled in the partitioned portions, from the inside of the partitioned portions, which are formed between the heat-transferring fins, to the outside of the partitioned portions is restricted by the cooperation of neighboring heat-transferring fins. The shape of respective heat-transferring fins maybe selected variously as the case may be as long as such shape can form the partitioned portions. As described above, because the structure of the heat-transferring fins themselves forms the partitioned portions, the configuration can be simplified and such configuration can effectively reduce a cost in manufacturing the solid filling tank.

Further in the first and second aspect of the invention, as a third aspect of the invention, it is preferable that a plurality of the heat-transferring fins should be configured by first heat-transferring fins formed in a corrugated plate shape and second heat-transferring fins formed in a flat plate shape, and that the plurality of partitioned portions are formed between the superposed surfaces by arranging alternately the first heat-transferring fins and the second heat-transferring fins in parallel to each other. The movement of the solid particles, which are filled in the partitioned portions, from the inside of the partitioned portions, which are formed between the heat-transferring fins, to the outside of the partitioned portions is restricted by the cooperation of the first heat-transferring fins and the second heat-transferring fins. In the above described configuration, since the partitioned portions are formed only by arranging alternately the first heat-transferring fins and the second heat-transferring fins in parallel to each other, the structure of the solid filling tank can be simplified.

In the third aspect of the invention, because the first heat-transferring fins and the second heat-transferring fins are employed, the configuration can be simplified further and such configuration is effective to reduce a manufacturing cost. Also, because the first heat-transferring fins and the second heat-transferring fins are employed, contact areas between the first and the second heat-transferring fins and the solid particles can be increased and such configuration is effective to improve the heat-transferring performance.

Further in the first to the third aspect of the invention, as a fourth aspect of the invention, it is preferable that the heat-transferring fins should be configured to have a plurality of through holes that configured to permit the solid particles to pass therethrough, and the partitioned portions provided between the heat-transferring fins are configured to be communicated with each other via the through holes respectively. Therefore, the through holes in the heat-transferring fins can be employed to disperse the solid particles when such solid particles are filled into the solid filling tank. In particular, when the hydrogen absorbing alloy powders are filled in the filling tank, respective heat-transferring fins being fitted in the tank are held horizontally with respect to the loading surface. In this state, the hydrogen absorbing alloy powders are supplied from the top portion of the uppermost heat-transferring fin. As a result, the hydrogen absorbing alloy powders are supplied sequentially to the lower heat-transferring fin side via the through holes formed in the heat-transferring fins due to the self-weight falling action, and thus are filled effectively in respective spaces between the heat-transferring fins. The through holes are also capable of dispersing an absorbing or adsorbing gas in the tank.

As described above, according to the solid filling tank of the fourth aspect of the invention, the movement of the solid particles being filled in the tank can surely be prevented without lowering the heat exchanging performance between the solid particles and the heat exchanger, and filling of the solid particles can be executed rationally.

According to a fifth aspect of the invention, the solid filling tank is configured to have a structure in which hydrogen absorbing alloy powders that absorb the hydrogen as the solid particles are filled in the tank main body of the solid filling tank. The hydrogen absorbing alloy reacts with the hydrogen to produce metal hydride, and has such a property that absorbs hydrogen to generate heat when a gas pressure is increased or a temperature is lowered in the hydrogen gas and discharges the hydrogen to absorb the heat when a gas pressure is lowered or a temperature is increased. As the hydrogen absorbing alloy, for instance, Mg—Ni alloy, La—Ni alloy or Ti—Mn alloy may be employed. In the solid filling tank in which the hydrogen absorbing alloy powders are filled, the request for the desire to prevent the subsidence of the solids being filled in the tank without lowering the heat exchanging performance between the solid particles and the heat exchanger is particularly strong. This is because the excessive stress is generated locally in some cases when the filled hydrogen absorbing alloy powders subside and expand in the tank when absorbing the hydrogen. As a result, the solid filling tank according to the fifth aspect of the invention is particularly advantageous in such technical field. The solid filling tank in which such hydrogen absorbing alloy powders are filled can be employed in the hydrogen storing technology of the fuel system for the hydrogen fuel cell vehicle.

Referring now to the accompanying drawings, a description will be given in detail of preferred embodiments of the invention.

Hereinafter, a description will be made of the embodiment where the invention is applied to a hydrogen storing tank as one of a solid filling tank (storage tank) that accommodates a gas absorbing body (solid particles). The hydrogen storing tank is employed in the hydrogen storage technology for the fuel system of the hydrogen fuel cell vehicle, for example. For convenience of explanation, the hydrogen absorbing alloy filled in the hydrogen storing tank is also denoted as "MH" in the following explanation.

Figure 2:
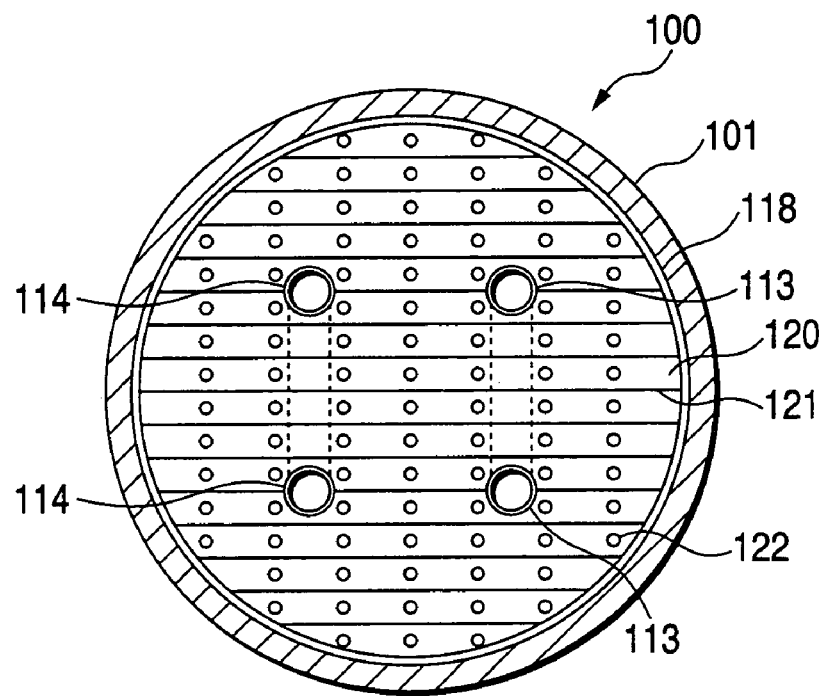
FIG. 2 is a sectional view, taken along a II—II line in FIG. 1, showing a configuration of a first heat-transferring fin.
Figure 3:
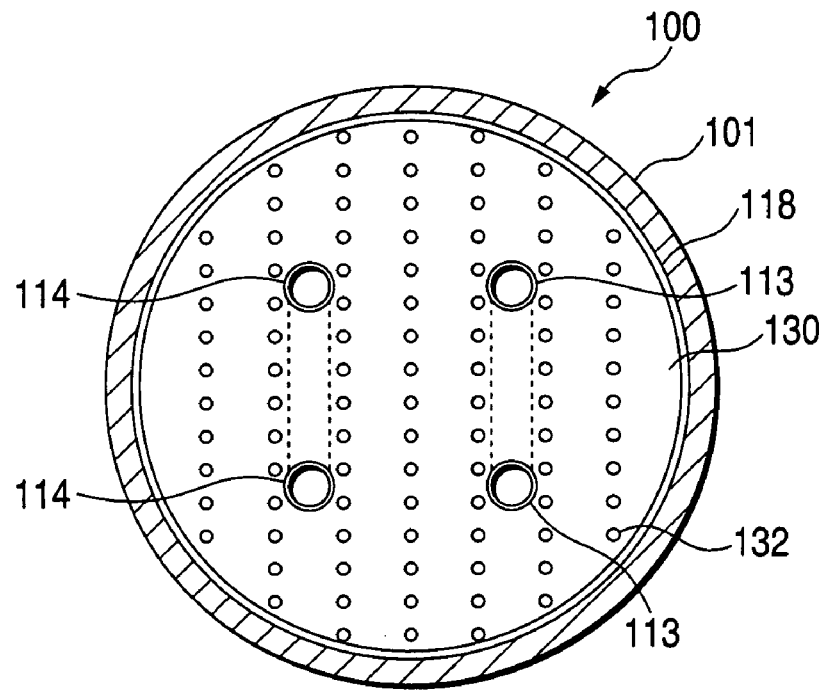
FIG. 3 is a sectional view, taken along a II—II line in FIG. 1, showing a configuration of a second heat-transferring fin.
Figure 4:
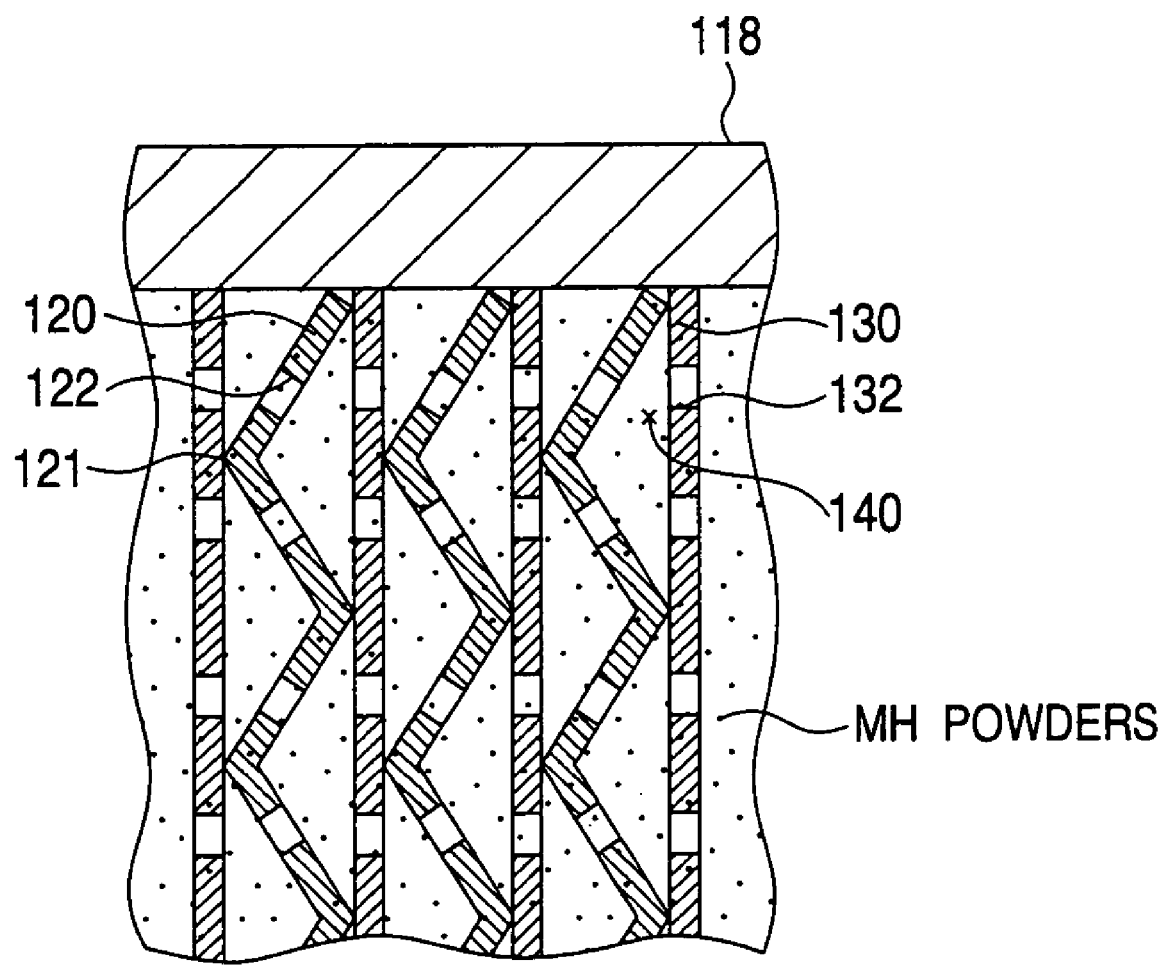
FIG. 4 is an enlarged view showing a circumferential portion of the solid filling tank shown in FIG. 1.

A configuration of a hydrogen storing tank (hereinafter, referred to simply as "MH tank") 100 according to an embodiment of the present invention will be explained by reference to FIG. 1 through FIG. 4. FIG. 1 is a sectional view showing a configuration of a hydrogen storing tank (MH tank) 100 according to the present embodiment. FIG. 2 is a sectional view taken along a II—II line in FIG. 1 and showing a configuration of a first heat-transferring fin 120. FIG. 3 is a sectional view taken along the II—II line in FIG. 1 and showing a configuration of a second heat-transferring fin 130. FIG. 4 is a partially enlarged view of FIG. 1.

As shown in FIG. 1, the hydrogen storing tank (MH tank) 100 serving as the solid filling tank according to the present invention is filled with hydrogen absorbing alloy powders (hereinafter, referred to simply as "MH powders") as the solid particles, and has such a structure that a heat exchanger 110 is disposed in a cylindrical tank shell portion 101 (which corresponds to a "tank main body" in the present invention). The MH tank 100 is used in a state where placed transversally as shown in FIG. 1. Respective constituent members that are concerned with heat transfer in the heat exchanger 110 including the tank shell portion 101 are formed of metal having good characteristic in heat-transferring such as aluminum and copper.

Figure 5:
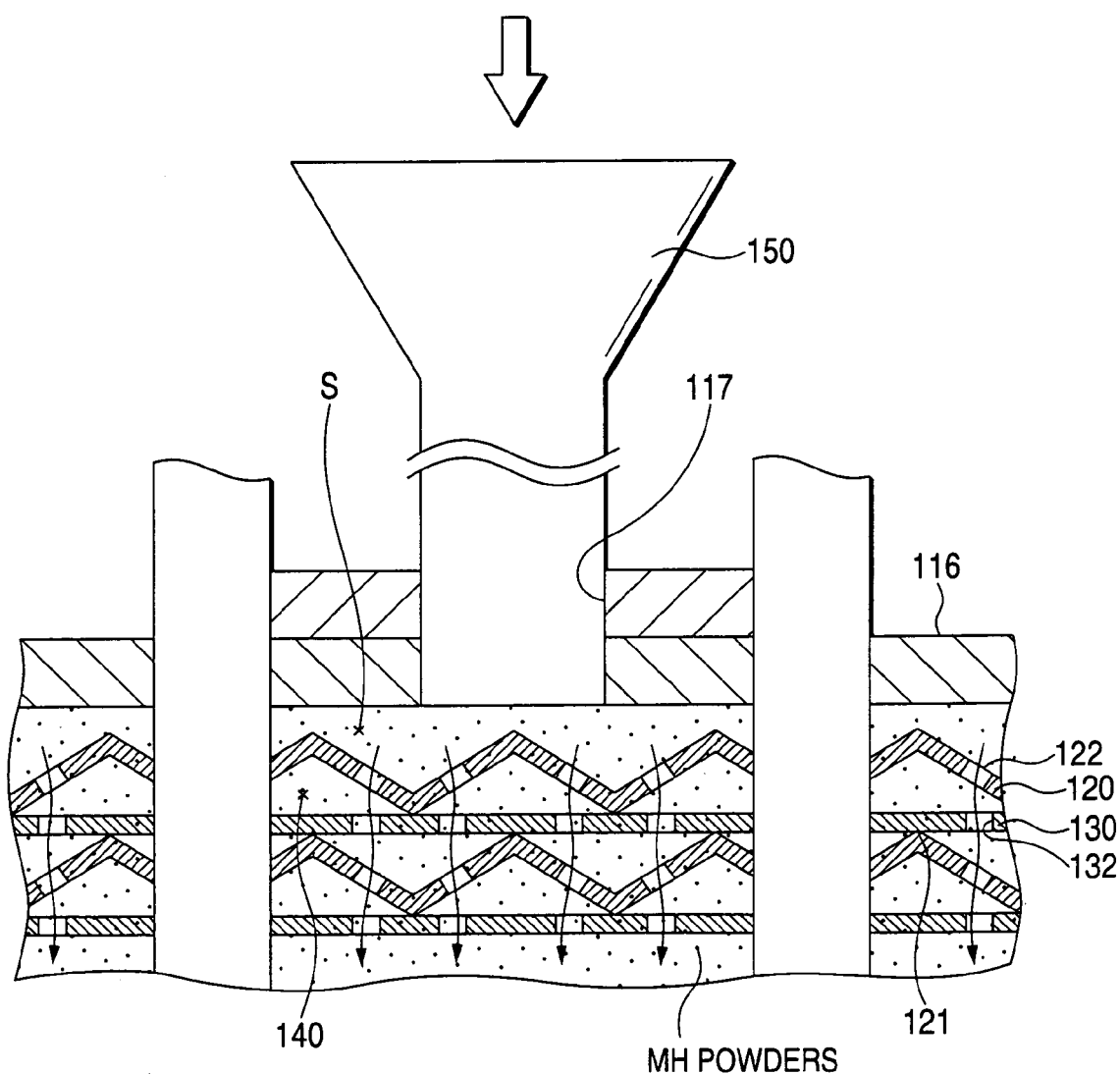
FIG. 5 is a sectional view showing a circumferential portion of the hydrogen storing tank at the time of filling hydrogen absorbing alloy powders.

The tank shell portion 101 is constructed to have a predetermined pressure-resisting performance when absorbing hydrogen. A cylindrical filter 118 is provided between an inner periphery of the tank shell portion 101 and an outer periphery of the heat exchanger 110 to prevent scattering of the MH powders. Also, a fitting portion 102 is provided on the side portion of the tank shell portion 101. A filling jig 150 described later in FIG. 5 is fitted to this fitting portion 102 when filling the MH powders.

The heat exchanger 110 includes cooling/heating medium tubes 113, 114 (which corresponds to a "circulation tube" in the present invention) through which heating or cooling medium (refrigerant, heating medium) is circulated, and a plurality of heat-transferring fins 120, 130 that are jointed to outer peripheries of the cooling/heating medium tubes 113, 114 by brazing. The heat exchanger 110 is configured as the so-called "fin and tube type". In the heat exchanger 110, the medium that flows in from an inlet portion 111 is branched into the U-shaped cooling/heating medium tubes 113, 114 to flow through the tubes in parallel, then is united after one circulation, and then flows out from an outlet portion 112. In the heat exchanger 110, the shapes of the cooling/heating medium tubes 113, 114 may be configured variously, and combination of plural U-shaped tubes, for example, may be employed.

An interior space portion S is formed by circular end plates 115, 116 in the tank shell portion 101. A plurality of the first heat-transferring fins 120 and a plurality of the second heat-transferring fins 130 are installed in the interior space portion S. The first heat-transferring fins 120 and the second heat-transferring fins 130 are arranged in parallel to each other (in a layered manner) in the direction that is perpendicular to the extending direction of the cooling/heating medium tubes 113, 114 (which is also the longitudinal direction of the tank shell portion 101). Accordingly, the heat transfer (heat exchange) is carried out between the medium, which is circulated through the cooling/heating medium tubes 113, 114, and the MH powders, which are filled in the interior space portion S, via the first heat-transferring fins 120 and the second heat-transferring fins 130. The filling of the MH powders into the interior space portion S is executed through a filling port 117 that is formed on the end plate 116. When using the MH tank 100, a filler screw (not shown) is provided to the filling port 117 to prevent the MH powders to be outpoured from the MH tank 100.

The first heat-transferring fin 120, when viewed as the plan view, has a circular shape corresponding to a cross section of the tank shell portion 101, and is formed in a corrugated plate shape that is bent at a plurality of fold-backed portions 121. The fold-backed portion 121 is formed in an acutely bent manner. The second heat-transferring fin 130, when viewed as the plan view, has a circular shape corresponding to the cross section of the tank shell portion 101, and is formed in a flat plate shape. The first heat-transferring fin 120 and the second heat-transferring fin 130 are jointed by brazing at contact portions in their laminated state (contact portions between the fold-backed portion 121 of the first heat-transferring fin 120 and the second heat-transferring fin 130).

As shown in FIG. 2, a plurality of through holes 122, a size of which permits the MH powders to pass therethrough, are formed in the first heat-transferring fin 120. Also, as shown in FIG. 3, a plurality of through holes 132 that have approximately the same shape as the through hole 122 are formed in the second heat-transferring fin 130. In the embodiment, respective number and position of the through holes 122 and the through holes 132 are configured to be identical. As a result, as shown in FIG. 4, in the situation that the first heat-transferring fins 120 and the second heat-transferring fins 130 are arranged, positions of the through holes 122 of the first heat-transferring fin 120 and positions of the through holes 132 of the second heat-transferring fin 130 are matched substantially with each other along the longitudinal direction of the tank shell portion 101. In FIGS. 4 and 5, and in FIGS. 7 and 8 which will be described later, the state in which a filling density of the hydrogen absorbing alloy powders (MH powders) is excessively low is shown. However, the MH powders are filled in a state of closest packing when such powders are actually filled.

A plurality of partitioned portions 140, whose cross section is approximately triangular shape, are formed by the first heat-transferring fins 120 and the second heat-transferring fins 130. Each partitioned portion 140 is communicated with the neighboring separate partitioned portion 140 only via the through hole 122 and the through hole 132. Since the partitioned portions 140 are provided, it can be restricted that the filled MH powders are moved by the self-weight falling action in the subsiding direction (the downward direction in FIG. 4) in which a direction in parallel with the heat-transferring fins. In other words, the restricting portion is implemented rationally by using the cooperation of the first heat-transferring fins 120 and the second heat-transferring fins 130. In the embodiment, the first heat-transferring fins 120 and the second heat-transferring fins 130 are configured to have the restricting portion capable to restrict the subsidence (movement) of the MH powders in addition to their original capability for executing the heat transfer (heat exchange) with the MH powders. Since the first heat-transferring fins 120 and the second heat-transferring fins 130 are capable to restrict the movement of the MH powders in the subsiding direction, the movement of the MH powders filled in the tank in the subsiding direction can be prevented without lowering the heat exchanging performance between the MH powders and the heat exchanger 110.

Hereinafter, a state of filling the MH powders as the solids in the present invention into the MH tank 100 having the above structure will be explained with reference to FIG. 5. FIG. 5 is a partial sectional view showing the hydrogen storing tank (MH tank) 100 when filling the hydrogen absorbing alloy powders (MH powders).

As shown in FIG. 5, in filling the MH powders, the MH tank 100 is positioned vertically. Then, the filler screw (not shown) provided to the filling port 117 in using the tank is removed, and the filling jig 150 is fitted through the fitting portion 102 of the tank shell portion 101 and the filling port 117. Then, when it is started to inject the MH powders from the filling jig 150 by a predetermined amount, the MH powders are supplied into the interior space portion S. Then, due to the self-weight falling action, the MH powders are moved from the upper partitioned portions 140 to the lower partitioned portions 140 through the through holes 122 and the through holes 132. The MH powders are thus filled almost uniformly in respective partitioned portions 140 in the interior space portion S.

In the present embodiment, because the positions of the through holes 122 of the first heat-transferring fin 120 coincide substantially with the positions of the through holes 132 of the second heat-transferring fin 130 along the longitudinal direction of the tank shell portion 101, the MH powders can be spread over (dispersed) in the entire volume of the interior space portion S. Therefore, in the MH tank 100, an operation of filling the MH powders can be carried out quickly and surely. When the filling of the MH powders by a predetermined amount is completed, the filler screw (not shown) is screwed into the filling port 117 so as to prevent the filled MH powders to be outpoured from the MH tank 100.

Hereinafter, a method of absorbing/discharging the hydrogen by using the MH tank 100 will be explained with reference to FIG. 1. Normally, the hydrogen absorbing alloy (MH) has such a property that absorbs hydrogen when heat is removed therefrom, whereas the MH discharges the hydrogen being absorbed once when the heat is applied thereto. The following method employs the above property of the MH.

When the MH tank 100 is caused to absorb the hydrogen, a connection piping with a valve (not shown) is connected to the fitting portion 102 shown in FIG. 1. Then, an interior of the MH tank 100 is set to a low pressure state by executing the sucking process via the connection piping by a predetermined vacuuming means. Then, in order to cool the MH powders that are filled in the interior space portion S according to the above procedures, the refrigerant such as cooling water (which corresponds to the "medium" in the present invention) is supplied from the inlet portion 111 of the heat exchanger 110. As a result, heat is removed from the MH powders in the MH tank 100 via the first heat-transferring fins 120 and the second heat-transferring fins 130 in the heat exchanger 110. Also, hydrogen (which corresponds to a "predetermined gas" in the present invention) is supplied to the inside of the MH tank 100 via the above connection piping. As a result, because the MH powders are cooled and the hydrogen is supplied to the MH powders, the MH powders absorb the supplied hydrogen. The temperature and pressure conditions in absorbing the hydrogen are configured appropriately in accordance with the composition of the MH powders.

When the hydrogen is discharged from the MH tank 100, the heating medium such as hot water (which corresponds to the "medium" in the present invention) is supplied from the inlet portion 111 of the heat exchanger 110. As a result, the heat is applied to the MH powders in the MH tank 100 via the first heat-transferring fins 120 and the second heat-transferring fins 130 in the heat exchanger 110, and the heat is applied to the MH powders, whereby the hydrogen is discharged from the MH powders and supplied to a predetermined destination of hydrogen supply via the connection piping with the valve used at the time of absorbing the hydrogen. The temperature and pressure conditions in this hydrogen discharge are configured appropriately in accordance with the composition of the MH powders.

In a case where the MH tank 100 is employed as the hydrogen supply source of the electric vehicle equipped therewith as a fuel cell, in order to execute the quick and continuous power generation, not only the hydrogen must be certainly taken out but also the hydrogen must be quickly taken out in response to the requests for the running condition of the vehicle. In order to extract the hydrogen quickly and surely from the MH tank 100, the hydrogen must be discharged quickly and firmly from the MH powders absorbing hydrogen. For this reason, the heat must be applied (heated) quickly and surely to the overall MH powders. Therefore, for such an employment, the present embodiment having the structure obtained by laminating mutually the first heat-transferring fins 120 each formed in corrugated plate shape and the second heat-transferring fins 130 each formed in flat plate shape, is advantageous since such structure can have large contact areas between the MH powders and the heat-transferring fins.

As described above, according to the embodiment, since the partitioned portions 140 are formed by the first heat-transferring fins 120 and the second heat-transferring fins 130, the movement of the MH powders filled in the tank shell portion 101 can be prevented without lowering the heat exchanging performance between the MH powders and the heat exchanger 110. As a result, it can be prevented from the filled MH powders being subsided in the tank and be prevented from any excessive stress being locally generated by the MH powders that expands when absorbing hydrogen. In particular, since the first heat-transferring fins 120 formed in corrugated plate shape and the second heat-transferring fins 130 formed in flat plate shape are employed, the structure of the MH tank 100 can be simplified and is advantageous for the reduction in a manufacturing cost thereof. Also, the contact areas between heat-transferring fins and the MH powders can be enlarged, whereby the heat-transfer performance can be improved.

Also, in the present embodiment, since the structure in which the through holes 122 are formed in the first heat-transferring fins 120 and the through holes 132 are formed in the second heat-transferring fins 130 is employed, the filling of the MH powders can be carried out rationally.

Although a specific embodiment of the invention is described above, the present invention is not limited only to the above described embodiment, and various modifications and variations may be considered. For example, following modifications to which the above embodiment is applied may be embodied respectively.

In the embodiment described above, the heat exchanger 110 having the U-shaped cooling/heating medium tubes 113, 114 is set forth. However, the characteristics of the U-shaped cooling/heating medium tubes 113, 114 such as number to apply and shape thereof can be varied as the case may be. An example of the modified embodiment of the U-shaped cooling/heating medium tubes 113, 114 will be explained with reference to FIG. 6 hereunder.

Figure 6:
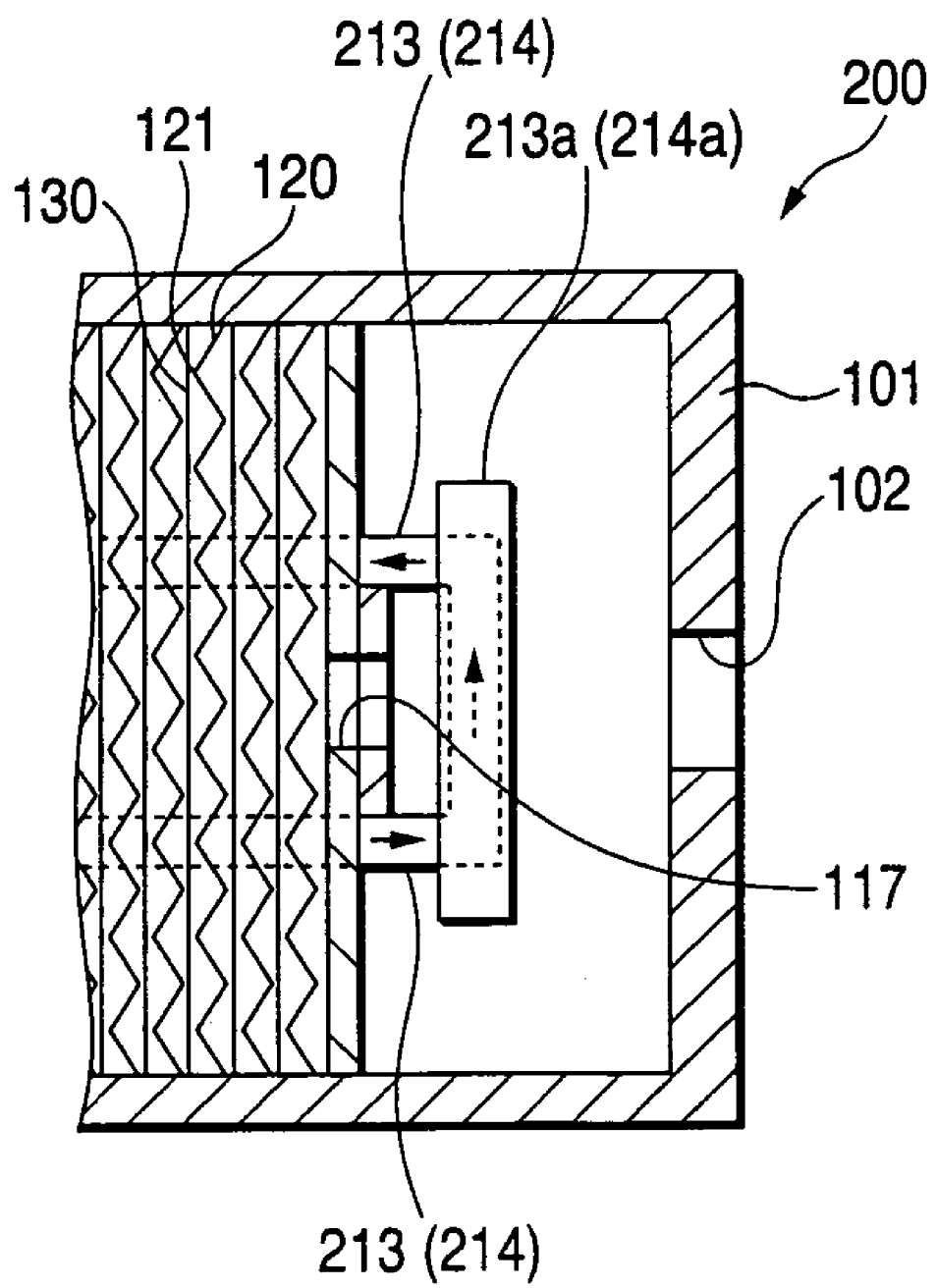
FIG. 6 is a partial sectional view showing a configuration of a heat exchanger according to another embodiment of the invention.

In a heat exchanger 200 shown in FIG. 6, a pair of pipings 213 each formed in straight pipe shape is connected by a block member 213a in which the circulation path is provided. The structure of the pipings 213 is equivalent to the configuration of the cooling/heating medium tube 113. Also in the heat exchanger 200, another pair of pipings 214 each formed in straight pipe shape is connected by a block member 214a in which the circulation path is provided. The structure of the pipings 214 is equivalent to the configuration of the cooling/heating medium tube 114. In the heat exchanger 200, the medium that flows in from the inlet portion 111 is branched into the upstream-side piping 213 and the upstream-side piping 214. The medium that flows through the upstream-side piping 213 flows out from the outlet portion 112 via the circulation path in the block member 213a and the downstream-side piping 213. The medium that flows through the upstream-side piping 214 flows out from the outlet portion 112 via the circulation path in the block member 214a and the downstream-side piping 214. According to such configuration, an amount of projection of the tank shell portion 101 in the longitudinal direction (the lateral direction in FIG. 6) can be suppressed rather than the U-shaped cooling/heating medium tubes 113, 114, and thus a more compact configuration can be implemented.

Figure 7:
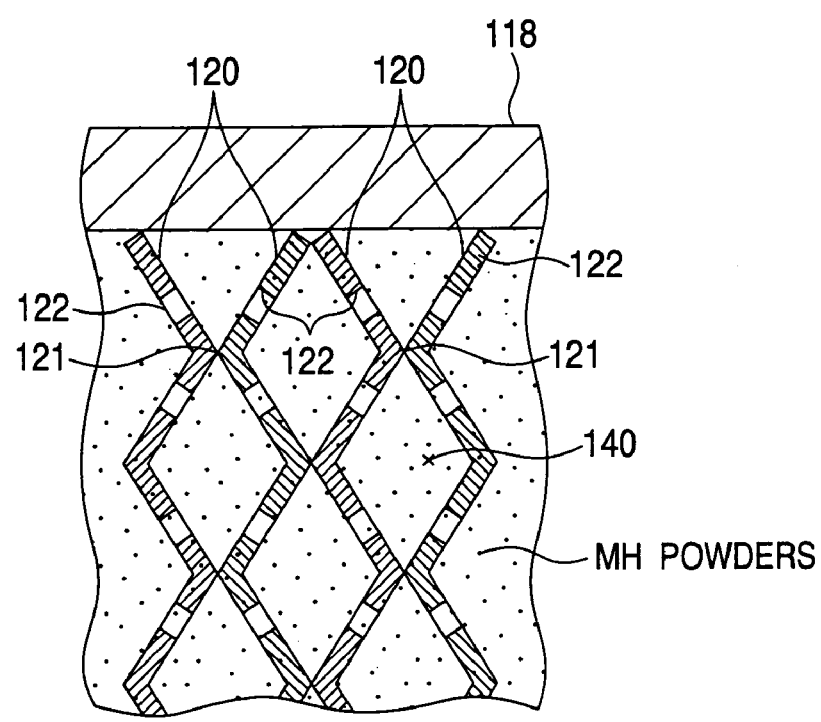
FIG. 7 is a view showing another embodiment of the heat-transferring fins that are arranged in a tank shell portion.
Figure 8:
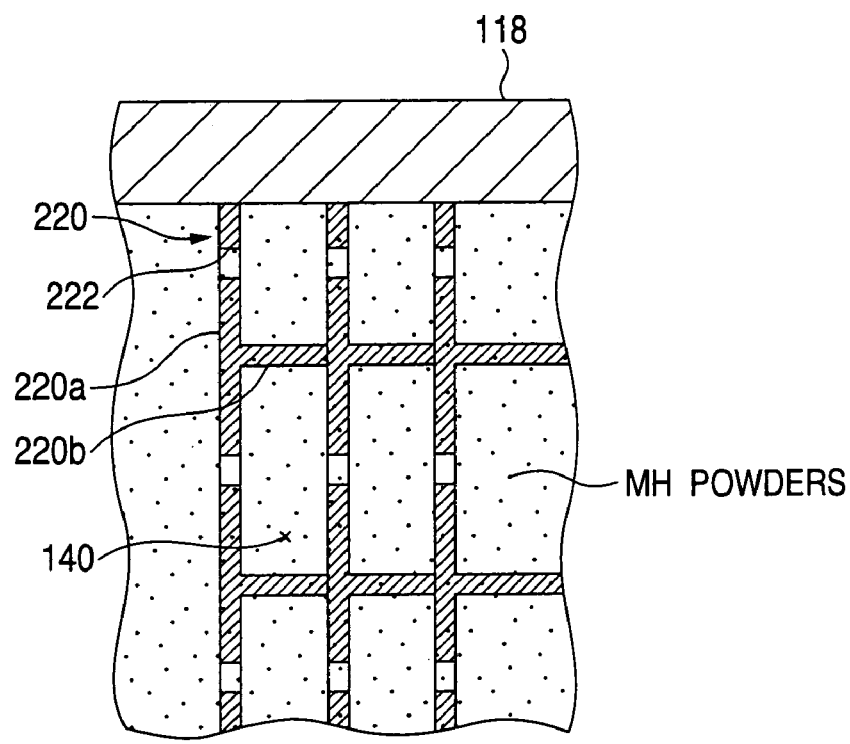
FIG. 8 is a view showing still another embodiment of the heat-transferring fins that are arranged in the tank shell portion.

In the embodiment described above, the case where the partitioned portions 140 are formed by laminating the first heat-transferring fins 120 and the second heat-transferring fins 130 alternately is set forth. However, the configurations in forming the partitioned portions 140, such as the arrangement of the heat-transferring fins, and the type of the heat-transferring fins used, can be varied as the case may be. An explanation with reference to FIGS. 7 and 8 will be made hereunder. In FIGS. 7 and 8, the same symbols are affixed to the same elements as those shown in FIG. 4.

In a modified example of the embodiment described above, only a plurality of the first heat-transferring fins 120 are employed and are superposed and jointed mutually, as shown in FIG. 7. In the modified embodiment shown in FIG. 7, a plurality of partitioned portions 140 whose cross section is an almost rhombic shape are formed between each of the first heat-transferring fins 120. Each partitioned portion 140 is communicated with the neighboring separate partitioned portion 140 via the through hole 122. In another modified example of the embodiment described above, a plurality of heat-transferring fins 220 that have a shape different from the first heat-transferring fin 120 and the second heat-transferring fin 130 are employed as shown in FIG. 8. Each heat-transferring fin 220 is composed of a flat surface portion 220a and a plurality of upright portions 220b that are provided upright from one surface of the flat surface portion 220a. Also, a plurality of through holes 222 that are similar to the through holes 122 and the through holes 132 are formed in each heat-transferring fin 220. A plurality of partitioned portions 140 whose cross section is an almost rectangle shape are formed between each of the flat surface portion 220a and plural upright portions 220b of the predetermined heat-transferring fin 220 and the flat surface portion 220a of the neighboring separate heat-transferring fin 220. Each partitioned portion 140 is communicated with the neighboring separate partitioned portion 140 via the through hole 222. As described in above, according to the modified embodiments shown in FIGS. 7 and 8, the same advantages as those in the embodiment in which the first heat-transferring fins 120 and the second heat-transferring fins 130 are laminated alternately can be achieved.

In the embodiment described above, the first heat-transferring fins 120 and the second heat-transferring fins 130, which have the circular shape when viewed as the plan view, are set forth. However such shape may be varied appropriately into other shapes such as a quadrangular shape as the case may be.

In the embodiment described above, the technology to construct the hydrogen storing tank is set forth. However, the present invention may be applied to the technology to construct various solid filled tanks in which the solids that are capable of adsorbing the hydrogen (e.g. carbon, molecular sieve) or the solids that are capable of absorbing or adsorbing a gas other than the hydrogen (e.g. nitrogen) are filled.

In the embodiment described above, the partitioned portion 140 may be simply communicated with the neighboring separate partitioned portion 140 only via the through holes 122, 132. The characteristics of these through holes 122, 132 such as a number thereof to be applied or a location thereof to be applied may be varied as the case may be.

In the embodiment described above, the first heat-transferring fins 120 formed in the corrugated plate shape in which the fold-backed portion 121 are formed in an acutely bent manner are set forth. However the shape of the first heat-transferring fin 120 may be varied as the case may be. For example, heat-transferring fin in which a portion corresponding to the fold-backed portion 121 is curved at a predetermined curvature R may be employed in place of the first heat-transferring fin 120. Also, a heat-transferring fin having a structure in which the fold-backed shape constitutes not only a triangular shape but also a rectangular (square) shape may be employed.

As described above, according to the present invention, in the solid filling tank in which the heat exchanger is fitted in the tank main body in which solids that are capable of absorbing or adsorbing a predetermined gas are filled, the technology that is useful to prevent certainly the movement of the solids filled in the tank without lowering the heat exchanging performance between the solids and the heat exchanger can be implemented.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A solid filling tank comprising:
    a tank main body configured to be filled with solid particles capable of absorbing or adsorbing a predetermined gas; and
    a heat exchanger disposed within the tank main body, wherein the heat exchanger comprises:
        a circulation tube configured to circulate a medium to exchange heat with the solid particles; and
        a plurality of heat transferring fins each attached to the circulation tube and arranged in parallel to each other,
            wherein the heat-transferring fins comprise a restricting portion configured to restrict movement of the solid particles in a subsiding direction of the solid particles, the restricting portion comprises a plurality of partitioned portions formed in between each opposing pair of the heat-transferring fins.

2. The solid filling tank as claimed in claim 1, wherein the subsiding direction comprises a direction in parallel to the heat-transferring fins.

3. The solid filling tank as claimed in claim 1, wherein the heat-transferring fins comprise a first heat-transferring fin formed in corrugated plate shape and a second heat-transferring fin formed in flat plate shape,
    wherein the first heat-transferring fin and the second heat-transferring fin are arranged alternatively in parallel to each other, and wherein the restricting portion comprises the partitioned portion formed in between each of the opposing pair of the first heat-transferring fin and the second heat-transferring fin.

4. The solid filling tank as claimed in claim 1, wherein the heat-transferring fins comprise a through hole configured to permit the solid particles to pass therethrough, and wherein the plurality of partitioned portions are configured to be communicated with each other via the through hole.

5. The solid filling tank as claimed in claim 1, wherein the solid particles comprise hydrogen absorbing alloy powder capable of absorbing hydrogen.

6. A solid filling tank comprising:

a tank main body configured to be filled with solid particles capable of absorbing or adsorbing a predetermined gas; and a heat exchanger disposed within the tank main body, wherein the heat exchanger comprises:

a circulation tube configured to circulate a medium to exchange heat with the solid particles; and a plurality of heat transferring fins each attached to the circulation tube, the heat-transferring fins comprise a first heat-transferring fin formed in corrugated plate shape and a second heat-transferring fin formed in flat plate shape, which are arranged alternatively in parallel to each other, and the heat-transferring fins further comprise a through hole configured to permit the solid particles to pass therethrough, wherein the heat-transferring fins comprise a restricting portion configured to restrict movement of the solid particles in a subsiding direction of the solid particles and the restricting portion comprises a plurality of partitioned portions formed in between each of the opposing pair of the first heat-transferring fin and the second heat-transferring fin, and the plurality of partitioned portions are configured to be communicated with each other via the through hole.

* * * * *